United States Patent Office 2,907,774
Patented Oct. 6, 1959

---

2,907,774

PROCESS FOR PREPARING MONOHALO-EPOXYALKENES

Donald L. MacPeek, South Charleston, W. Va., assignor to Union Carbide Corporation, a corporation of New York No Drawing. Application July 26, 1957
Serial No. 674,283

17 Claims. (Cl. 260—348)

This invention relates to the process of preparing monohaloepoxyalkenes. In one aspect this invention relates to the dehydrohalogenation of a dihalo-substituted epoxyalkane wherein the halo substituents are attached to vicinal carbon atoms which are positioned alpha, beta to the epoxy group.

The synthesis of monohalo-substituted epoxyalkene wherein the halo substituent is attached to the olefinic carbon atom which is positioned alpha to the epoxy group, such as, for example, 2-chloro-3,4-epoxy-1-butene and 2-bromo-3,4-epoxy-1-butene, has been reported in the literature. In 1939, Petrov[1] produced 2-chloro-3,4-epoxy-1-butene, i.e., chloroprene oxide, by the interaction of chloroprene with hypobromous acid to obtain 2-chloro-3-hydroxy-4-bromo-1-butene, followed by subsequent dehydrobromination of the latter compound over potassium hydroxide. Though no yields were reported by the author it is apparent that this process possesses obvious disadvantages in that the expensive hypohalous acid is employed and that two steps are required to produce the desired product. In 1940, Petrov[2] indicated another route to produce the isomeric analogue. In this reported work butadiene was brominated to yield a mixture of 1,4-dibromo-2-butene and 3,4-dibromo-1-butene. The former compound was reacted with potassium hydroxide to give 1-bromo-1,3-butadiene, followed by treatment with hypobromous acid to produce 1,4-dibromo-3-hydroxy-1-butene; subsequent dehydrobromination with potassium hydroxide gave 1-bromo-3,4-epoxy-1-butene. The disadvantages of this process are manifest. In 1952, Petrov[3] disclosed another method for producing 2-chloro-3,4-epoxy-1-butene by reacting chloroprene with hypochlorous acid to provide a mixture of chlorohydrins, i.e., 1,2-dichloro-4-hydroxy-2-butene and 2,4-dichloro-3-hydroxy-1-butene. The lesser quantity of the chlorohydrins, that is, 2,4-dichloro-3-hydroxy-1-butene, on dehydrochlorination over potassium hydroxide gave 2-chloro-3,4-epoxy-1-butene.

The present invention contemplates the preparation of monohaloepoxyalkenes having the structural formula:

I 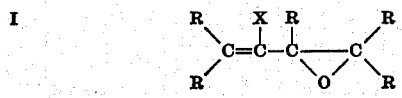

wherein each R is individually selected from the group consisting of hydrogen and alkyl radicals, preferably lower alkyl radicals, such as methyl, ethyl, propyl, n-butyl and the like; and wherein X is a halogen such as bromine and chlorine. A particularly preferred class of epoxyhaloalkenes are those in which the sum total of carbon atoms in the alkyl substituents, taken collectively, are less than six.

The monohaloepoxyalkenes characterized by structural Formula I above can be prepared by the reaction of substantially anhydrous alkali metal hydroxide slurried, suspended or dispersed in a suitable organic vehicle described herein below with a dihalo-substituted epoxyalkane characterized by the structural formula:

II 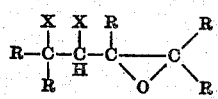

wherein the variables R and X have the same meanings as noted in Formula I above. Upon termination of the reaction, the desired product is separated from the reaction mixture, for example, by extraction, crystallization, or distillation, or filtration followed by distillation of the filtrate. It is readily apparent that the reaction is a dehydrohalogenation reaction; however, in view of the reactive nature of the epoxide starting material under the operative conditions of the process and its contact with a strong base, one would expect considerable hydrolysis (from the water of reaction), polymerization, rearrangement, and other competing reactions to occur. Consequently, it is quite surprising, indeed, that the epoxide group remains intact throughout the reaction. By the practice of the instant invention monohalo-substituted epoxyalkenes can be obtained in 80 to 85 percent, and higher, yields.

Accordingly, one or more of the following objects will be attained by the practice of the instant invention.

It is an object of this invention to provide a novel process for preparing monohaloepoxyalkenes. It is also an object of this invention to provide a novel one-step process for producing monohalo-substituted epoxyalkenes wherein the halo substituent is attached to the olefinic carbon atom which is positioned alpha to the epoxy group by the dehydrohalogenation of the corresponding dihalo-substituted epoxyalkane wherein the halo substituents are attached to vicinal carbon atoms which are positioned alpha, beta to the epoxy group. It is a further object of this invention to provide a novel dehydrohalogenation reaction involving a reactive class of halogenated epoxide compounds in contact with a strong inorganic base wherein competing reactions such as hydrolysis, polymerization, rearrangement, and the like are minimized. Numerous other objects of the present invention will become apparent to those skilled in the art from a consideration of the instant specification.

In one embodiment of the instant invention the novel dehydrohalogenation reaction can be carried out as follows: A concentrated aqueous solution of alkali-metal hydroxide, e.g., sodium hydroxide, is dissolved in an organic vehicle such as bis(β-ethoxyethyl)ether, after which the water therein is removed as by distillation. Upon removal of the water there results a dispersion of finely divided sodium hydroxide in the bis(β-ethoxyethyl)ether. Subsequently, this basic dispersion in the above-exemplified ether vehicle is heated to the desired temperature, preferably under reduced pressure and with agitation, and the dihalo-substituted epoxyalkane, e.g., 3,4-dichloro-1,2-epoxybutane, is added thereto. The addition of the epoxide reagent is preferably controlled so that a fairly constant reaction mixture level is maintained in the reaction zone. The dehydrohalogenation reaction quickly commences, and a mixture of chloroprene oxide, i.e., 2-chloro-3,4-epoxy-1-butene, water, and entrained organic vehicle is removed, preferably by distillation.

---

[1] A. A. Petrov, Jour. Gen. Chem., USSR, 9, pages 2232–43 (1939); Chem. Abst., 34, p. 5050 (1940).
[2] A. A. Petrov, Jour. Gen. Chem., USSR, 10, pages 1887–93 (1940); Chem. Abst., 35, p. 4347 (1941).
[3] A. A. Petrov, Jour. Gen. Chem., USSR, 22, pages 1516–28 (1952); Chem. Abst., 47, p. 8643 (1953).

The optimum operating conditions of the process of the instant invention will depend upon several factors, such as correlation of temperature and pressure, the particular dihalo-substituted epoxyalkane, alkali metal hydroxide, and organic vehicle employed, the rate of addition of the starting reagent, i.e., the dihalogenated epoxide compound, rate of removal of the products, and other factors. The dehydrohalogenation process can be conducted at a temperature as low as 35° C., or lower; the upper temperature limitation is primarily governed by the temperature at which the product is stable in the presence of the reaction mixture. In general, a temperature in the range from about 35° to about 200° C. is satisfactory; a temperature in the range from about 60° to about 125° C. is preferred. The dehydrohalogenation reaction can be conducted under a pressure in the range from about 10 to about 760 mm. of Hg, and preferably from about 50 to about 200 mm. of Hg. As a practical matter, the pressure and temperature are correlated so as to give optimum results.

The basic reagents applicable in the instant process are the alkali metal hydroxides such as sodium hydroxide, potassium hydroxide and the like. Sodium hydroxide is particularly preferred both from a standpoint of economy and greater efficiency. In actual operation, substantially anhydrous alkali metal hydroxide is dispersed in a suitable organic vehicle to be described hereinafter. The basic dispersion of the basic reagent in the organic vehicle can be accomplished by several routes, such as, for example, by grinding or pulverizing solid alkali metal hydroxide to a finely divided particle size and adding same to the organic vehicle with agitation thereof. A particularly suitable method is to dissolve solid alkali metal hydroxide in sufficient water to effect solution. This aqueous basic solution is then dissolved in the organic vehicle, and the resulting solution is subsequently heated to drive off the water content. A substantial anhydrous dispersion of alkali metal hydroxide in the vehicle is obtained.

The organic vehicles contemplated are those which are miscible with water and do not contain active hydrogen, i.e., hydrogen attached to oxygen, nitrogen or sulfur. Consequently, the water of reaction will dissolve in the organic vehicle thereby decreasing the formation of gummy aggregates which can form in the reaction mixture. Illustrative vehicles include, among others, the dialkyl ethers, organic saturated cyclic ethers, low molecular weight liquid polyethers, and the like, for example, dimethyl ether, diethyl ether, methyl ethyl ether, methyl isopropyl ether, methyl isobutyl ether, propyl butyl ether, dioxane, bis($\beta$-ethoxyethyl)ether, bis($\beta$-ethoxypropyl)-ether, bis($\beta$-ethoxybutyl)ether, and homologues thereof, and the like.

The term "organic vehicle," as used herein, including the appended claims, refers to those liquid organic compounds which are miscible with water and which do not contain active hydrogen atoms, such as the organic ether compounds illustrated above.

The proportions of alkali metal hydroxide to dihalo-substituted epoxyalkane which are employed in the instant invention can vary over a wide range. In general, from about 0.9 to about 4.0 equivalents of alkali metal hydroxide (dry basis) per equivalent of dihalo-substituted epoxyalkane is satisfactory; from about 1.0 to about 2.0 equivalents is preferred. It is desirable to employ from about 0.1 to about 0.5 part by weight of alkali metal hydroxide per part by weight of organic vehicle. A preferred range is from about 0.15 to about 0.25 part by weight of alkali metal hydroxide per part by weight of organic vehicle. The use of organic vehicle in excess of the above-stated ranges does not appear to appreciably increase the yield of product.

As stated previously, the dihalo-substituted epoxyalkane reagent can be added to the organic vehicle containing alkali metal hydroxide dispersed, slurried or suspended therein, the organic vehicle-alkali metal hydroxide admixture preferably being maintained at the predetermined operating conditions of temperature and pressure. Upon addition of the halogenated epoxide reagent the dehydrohalogenation reaction quickly commences resulting in the monohalo-substituted epoxyalkene product, water, and alkali metal halide. The monohalo-substituted epoxyalkene is preferably removed virtually as fast as it is formed, e.g., via distillation, together with water and entrained organic vehicle thus diminishing the possibility of undesirable competing reactions. The rate of addition of the halogenated epoxide reagent is preferably controlled so as to maintain a constant liquid volume in the reaction vessel. After the addition of the halogenated epoxide reagent has terminated, the distillation is continued until no additional product is taken overhead. The water phase then is separated from the distillate, e.g. by decantation, and redistillation of the organic phase results in substantially pure monohalo-substituted epoxyalkene product.

The dihalo-substituted epoxyalkanes characterized by Formula II above contemplated as starting material in this invention can be prepared by reacting an excess of the corresponding $\alpha,\beta$-dihaloalkene with peracetic acid dissolved in an inert medium such as ethyl acetate at approximately 65° C., followed by isolation of the $\alpha,\beta$-dihaloepoxyalkane product, for example, by distillation. Illustrative dihalo-substituted epoxyalkanes which can be employed in the instant invention include, among others, 3,4-dibromo-1,2-epoxybutane, 3,4-dichloro-1,2-epoxybutane, 4,5-dibromo-2,3-epoxypentane, 4,5-dichloro-2,3-epoxypentane, 3,4-dichloro-1,2-epoxypentane, 2-methyl-3,4-dichloro-1,2-epoxybutane, 2,4-dimethyl-3,4-dichloro-1,2-epoxypentane, 2-methyl-4-ethyl-3,4-dibromo-1,2-epoxyhexane, and the like.

Illustrative monohalo-substituted epoxyalkenes characterized by Formula I above which are produced by the instant dehydrohalogenation process include 2-bromo-3,4-epoxy-1-butene, 2-chloro-3,4-epoxy-1-butene, 2-bromo-3,4-epoxy-1-pentene, 2-chloro-3,4-epoxy-1-pentene, 3-chloro-4,5-epoxy-2-pentene, 2-chloro-3-methyl-3,4-epoxy-1-butene, 2,4-dimethyl-3-chloro-4,5-epoxy-2-pentene, 4-ethyl-2-methyl-3-bromo-1,2-epoxy-3-hexene, and the like.

The monohaloepoxyalkenes are a useful class of compounds. These compounds are bifunctional by virtue of the reactive vinyl and epoxy groups in the molecule. The monohaloepoxyalkenes can be copolymerized with other monomers, for example, vinyl chloride, acrylonitrile, and the like, to form useful polymers. The monohaloepoxyalkenes also are valuable intermediates in numerous chemical reactions. For example, they can be hydrolyzed (at the epoxy site) to the corresponding $\alpha,\beta$-diol which in turn can be reacted with long chain mono- and di-basic acids such as linoleic acid to form esters having utility as drying oils in the paint and varnish fields. The monohaloepoxyalkenes can be hydrogenated to form a mixture of saturated halo-substituted secondary alcohols which can be reacted with saturated aliphatic monocarboxylic acids to produce esters possessing utility as solvents, extenders and thinners.

The following examples are illustrative.

EXAMPLE 1

A slurry of 224 grams of finely divided potassium hydroxide in 2000 milliliters of diethyl ether was placed in a five-liter, four-necked flask equipped with a stirrer, thermometer and reflux condenser. At reflux (35°–40° C.), 282 grams of 3,4-dichloro-1,2-epoxybutane were added over a one hour period. Reflux and stirring were maintained for an additional two hours. The reaction mixture was then cooled to room temperature, i.e., approximately 25° C., and filtered. The clear filtrate was charged to a distillation kettle and fractionated through a 36 inch packed column. In this operation, 60 grams of chloroprene oxide, distilling at 108° C.–110° C. at atmospheric pressure, were obtained.

Physical properties

| Product | B.P., °C. (760 mm. of Hg) | Refractive Index ($n_D^{20}$) | Density ($d_4^{20}$) |
|---|---|---|---|
| Chloroprene oxide | 108–110 | 1.4579 | 1.1525 |

Analysis ($C_4H_5ClO$)

| | Cl | C | H |
|---|---|---|---|
| Calculated, percent | 33.6 | 45.6 | 4.77 |
| Found, percent | 34.0 | 46.2 | 5.26 |

EXAMPLE 2

A solution of 320 grams of sodium hydroxide in 320 grams of water was added to a flask containing 2000 milliliters of diethylene glycol diethyl ether. Under reduced pressure, the water was then removed by distillation. The resulting slurry was placed in a five-liter flask equipped with a stirrer, reflux condenser, thermometer and dropping funnel. A quantity of 100 milliliters of glass chips was added to facilitate stirring and erosion of deposits in the flask. At 85° C., 846 grams of 3,4-dichloro-1,2-epoxybutane were added over a one-hour period. The reaction was mildly exothermic and cooling was required. One hour later, the mixture was filtered and the filtrate placed in a still kettle attached to a packed column. A weight of 510 grams (81.4 percent of the theoretical yield) of chloroprene oxide was obtained on distillation after separation of the entrained water.

EXAMPLE 3

An experiment utilizing twice the amounts of materials specified in Example 2 was conducted in the following manner: When the anhydrous suspension of sodium hydroxide in diethylene glycol diethyl ether was ready for use, the reflux condenser was replaced by a short fractionating column equipped with a total-condenser variable-takeoff stillhead. At 85° C. and at a pressure of 100 mg. of Hg within this system, the addition of 3,4-dichloro-1,2-epoxybutane was begun. Simultaneously, crude chloroprene oxide and water as an azeotrope were removed at the stillhead. Shortly after the end of the 55-minute feed period, no additional chloroprene oxide distilled from the stored reaction mixture. Separation of the water layer from the cooled distillate, followed by redistillation, gave a total of 1044 grams of pure chloroprene oxide. This was a yield of 82.5 percent of the theoretical.

Although the invention has been illustrated by the preceding examples, the invention is not to be construed as limited to the materials employed in the above-said exemplary examples, but rather, the invention encompasses the generic concept as hereinbefore disclosed. Various modifications and embodiments of our invention can be made without departing from the spirit and scope thereof.

What is claimed is:

1. The process for preparing monohaloepoxyalkene wherein the halo substituent is attached to the olefinic carbon atom which is positioned alpha to the epoxy group which comprises contacting a dihalogenated epoxide compound having the following:

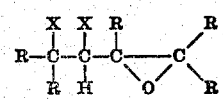

wherein each R is individually selected from the group consisting of hydrogen and an alkyl radical having from 1 to 4 carbon atoms, and wherein X is selected from the group consisting of chlorine and bromine; with an alkali metal hydroxide-organic ether vehicle admixture, said ether vehicle being miscible with water and not containing active hydrogen and functional groups which are reactive with ethylenic unsaturation and epoxy groups, said ether vehicle being selected from the group consisting of dialkyl ethers, organic saturated cyclic ethers, and low molecular weight saturated liquid polyethers; for a period of time sufficient to dehydrohalogenate said dihalogenated epoxide to the corresponding above-said monohaloepoxyalkene; and recovering said monohaloepoxyalkene product.

2. The process of claim 1 wherein said organic vehicle is a dialkyl ether.

3. The process of claim 1 wherein said organic vehicle is an organic saturated cyclic ether.

4. The process of claim 1 wherein said organic vehicle is a low molecular weight saturated liquid polyether.

5. The process of claim 2 wherein said dialkyl ether is dimethyl ether.

6. The process of claim 2 wherein said dialkyl ether is methyl isopropyl ether.

7. The process of claim 3 wherein said organic saturated cyclic ether is dioxane.

8. The process of claim 4 wherein said low molecular weight liquid polyether is bis($\beta$-ethoxyethyl)ether.

9. The process for producing monochloroepoxyalkene wherein the chloro substituent is attached to the olefinic carbon atom which is positioned alpha to the epoxy group of said monochloroepoxyalkene, and wherein the remaining carbon valences, individually, of the epoxyalkene unit are satisfied by a member selected from the group consisting of hydrogen and an alkyl radical having from 1 to 4 carbon atoms, which comprises contacting the corresponding dichloro-substituted epoxylkane in which the chloro substituents are attached to vicinal carbon atoms which are positioned alpha,beta to the epoxy group of said dichloro-substituted epoxyalkane, with alkali metal hydroxide slurried in an organic ether vehicle, said ether vehicle being miscible with water and not containing active hydrogen and functional groups which are reactive with ethylenic unsaturation and epoxy groups, said ether vehicle being selected from the group consisting of dialkyl ethers, organic saturated cyclic ethers, and low molecular weight saturated liquid polyethers, for a period of time and under operative conditions sufficient to vaporize the above-described monochloroepoxyalkene product from the reaction mixture, and recovering said monochloroepoxyalkene product as distillate.

10. The process of claim 9 wherein the dehydrochlorination reaction is conducted at a temperature in the range from about 35° C. to below about the temperature at which said monochloroepoxyalkene product decomposes.

11. The process of claim 9 wherein the dehydrochlorination reaction is conducted at a temperature in the range from about 35° to about 200° C., and at a pressure in the range from about 10 mm. of Hg to about atmospheric.

12. The process of claim 11 wherein the dehydrochlorination reaction is conducted at a temperature in the range from about 60° to about 125° C., and at a pressure in the range from about 50 to about 200 mm. of Hg.

13. The process of claim 10 wherein from about 0.9 to about 4.0 equivalents of alkali metal hydroxide per equivalent of dichloro-substituted epoxyalkane reagent is employed.

14. The process of claim 13 wherein from about 0.1 to about 0.5 part by weight of alkali metal hydroxide per part by weight of organic ether vehicle is employed.

15. The process of claim 14 wherein said alkali metal hydroxide is sodium hydroxide, and said organic ether vehicle is bis(β-ethoxyethyl)ether.

16. The process for producing a 2-chloro-3,4-epoxy-1-butene which comprises adding 3,4-dichloro-1,2-epoxybutane to a reaction zone containing sodium hydroxide dispersed in an organic ether vehicle, said reaction zone being maintained under operative conditions sufficient to vaporize 2-chloro-3,4-epoxy-1-butene product, and recovering said 2-chloro-3,4-epoxy-1-butene product.

17. The process for producing a 2-chloro-3,4-epoxy-1-butene which comprises continuously adding 3,4-dichloro-1,2-epoxybutane to a reaction zone containing sodium hydroxide dispersed in bis(β-ethoxyethyl)ether, maintaining the proportions of 3,4-dichloro-1,2-epoxybutane to sodium hydroxide at about 0.9 to about 4.0 equivalents of sodium hydroxide per equivalent of 3,4-dichloro-1,2-epoxybutane, conducting the dehydrochlorination reaction at a temperature in the range from about 35° to about 200° C. under reduced pressure, and recovering said 2-chloro-3,4-epoxy-1-butene product.

No references cited.